United States Patent [19]

Busch et al.

[11] Patent Number: 5,151,851
[45] Date of Patent: Sep. 29, 1992

[54] METHOD AND CIRCUIT ARRANGEMENT FOR GENERATING A SINUSOIDAL LINE AC VOLTAGE FROM A DC VOLTAGE

[75] Inventors: Peter Busch, Augsburg; Helmut Rettenmaier, Grossaitingen; Willi Sterzik, Augsburg, all of Fed. Rep. of Germany

[73] Assignee: Siemens Nixdorf Informationssystem AG, Munich, Fed. Rep. of Germany

[21] Appl. No.: 717,939

[22] Filed: Jun. 20, 1991

[30] Foreign Application Priority Data

Jun. 20, 1990 [DE] Fed. Rep. of Germany ....... 4019665

[51] Int. Cl.⁵ .......................................... H02M 7/538
[52] U.S. Cl. ........................................ 363/25; 363/24
[58] Field of Search .................. 363/25, 131, 133, 24, 363/23, 22; 323/222, 223, 349, 350

[56] References Cited

U.S. PATENT DOCUMENTS 3,517,300 6/1970 McMurray.
4,479,175 10/1984 Gille et al. ...................... 363/159 X
4,772,994 9/1988 Harada et al. .................. 363/164 X

FOREIGN PATENT DOCUMENTS 3912941 11/1989 Fed. Rep. of Germany.

OTHER PUBLICATIONS

"Regulating Pulse Width Modulator" Silicon General Product Catalog, 1984-85 pp. 93-102.
"Phase Controlled DC AC Converter with High Frequency Switching" Harada et al., IEEE Transactions on Power Electronics, vol. 3, No. 4, Oct. 1988, pp. 406-411.

*Primary Examiner*—Emanuel T. Voeltz
*Attorney, Agent, or Firm*—Hill, Van Santen, Steadman & Simpson

[57] ABSTRACT

Method and circuit arrangement for generating a sinusoidal line AC voltage from a DC voltage. For generating a sinusoidal line AC voltage from a DC voltage, the DC voltage is converted into a square-wave voltage having voltage pulses whose durations are controlled in accordance with the variation of the sinusoidal line AC voltage to be generated. The square-wave voltage is transmitted via a high-frequency transformer. Subsequently, the transmitted voltage pulses are respectively tapped and filtered for a given chronological duration. A secondary side of the high-frequency transformer is respectively shorted during pulse pauses caused by the sinusoidal control of voltage pulse durations for a simultaneous constant applied pulse frequency. In these phases, energy is transmitted back to the source of the DC voltage via the high-frequency transformer. As a result, the circuit arrangement can also be employed as a charging circuit.

10 Claims, 6 Drawing Sheets

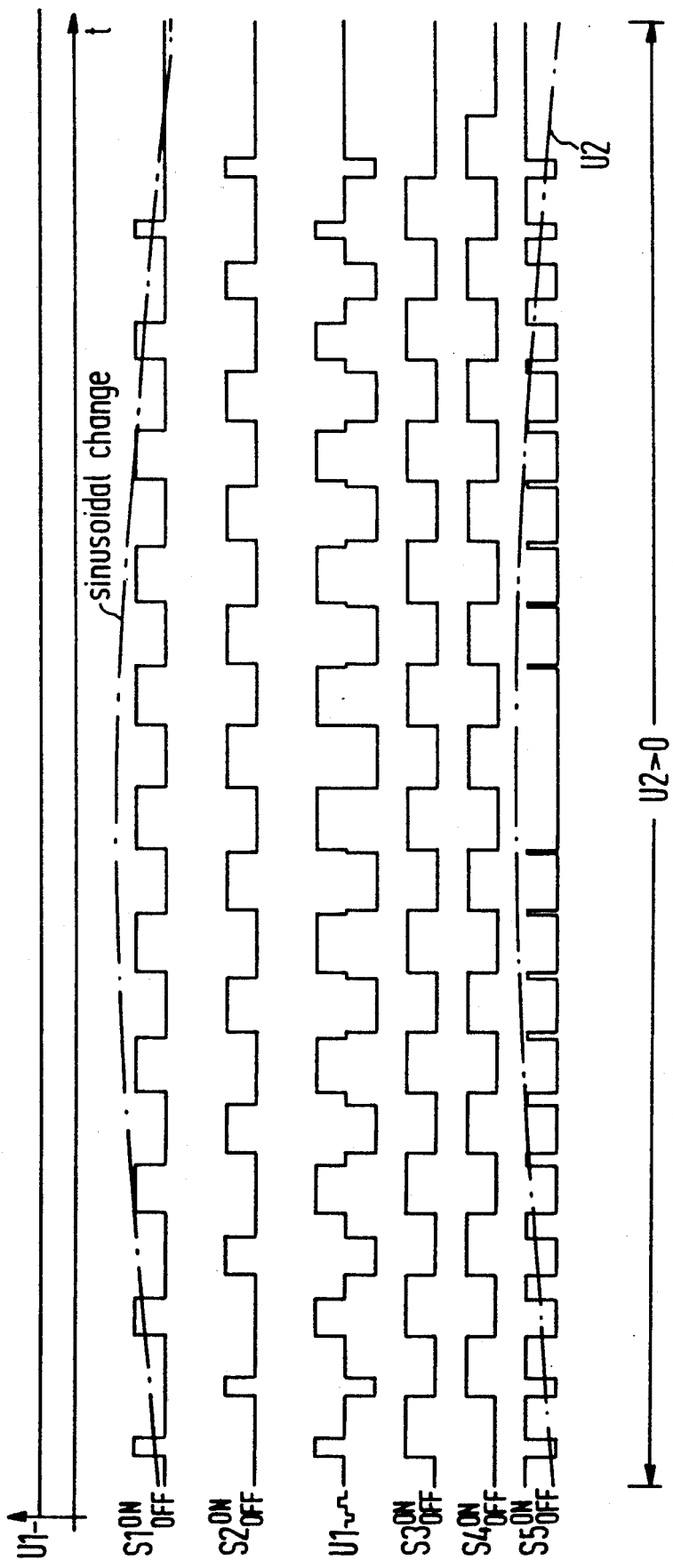

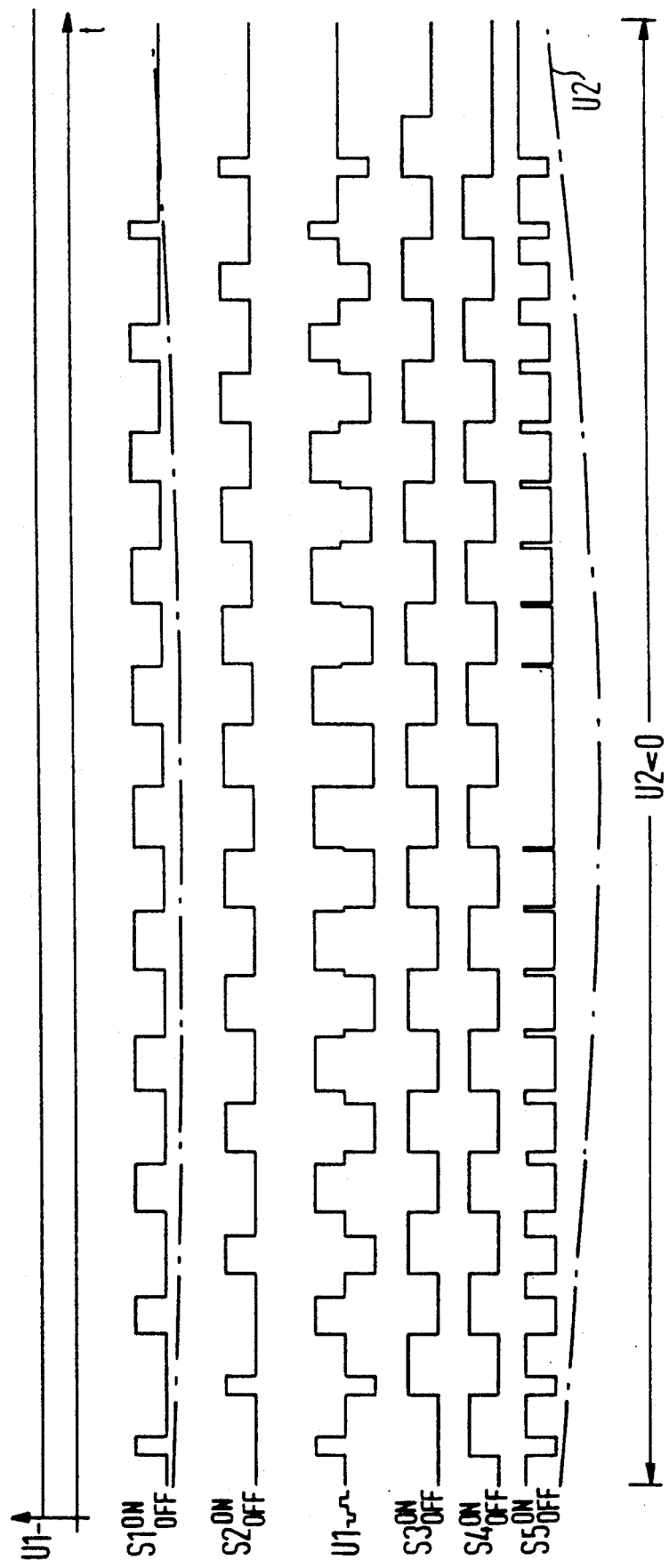

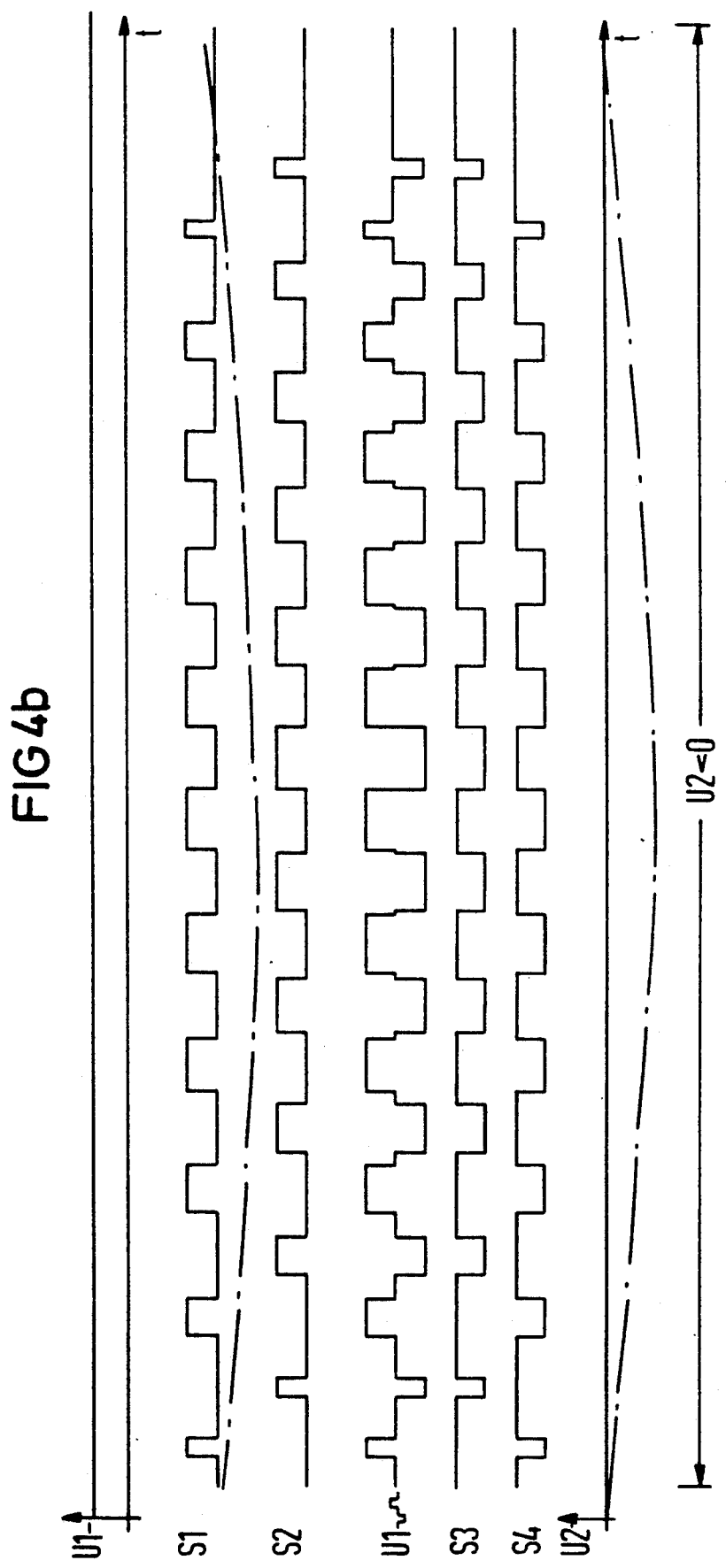

METHOD AND CIRCUIT ARRANGEMENT FOR GENERATING A SINUSOIDAL LINE AC VOLTAGE FROM A DC VOLTAGE

BACKGROUND OF THE INVENTION

The present invention is directed to a method for generating a sinusoidal line AC voltage from a DC voltage that, for transmission via a high-frequency transformer, is converted into alternatingly successive upward and downward square-wave voltage pulses having a respectively maximum pulse-duty factor of 50 percent and a constant pulse frequency, being tapped with a respectively given, fixed pulse-duty factor after the transmission and being then filtered. The present invention is also directed to a circuit arrangement for the implementation of the method.

With the use of computers, there is an increasing requirement for reliable operation of interruption-free power supplies even given network disturbances, for example line outage or line undervoltage. Currently, uninterrupted power supplies are manufactured as power supplies integrated in the computer or as preceding auxiliary devices. The preceding auxiliary devices contain an inverting rectifier that generates an AC voltage from a DC voltage given line errors.

Such an inverting rectifier is known, for example, from the U.S. Periodical IEEE Transactions on Power Electronics, Vol. 3, No. 4, October 1988, pages 406 through 411. The inverting rectifier is essentially composed of a transformer having two primary switches switched in push-pull and two secondary switches switched in push-pull and that is also composed of a filter circuit at the secondary side of the transformer. Both the primary switches as well as the secondary switches are respectively switched with a constant pulse-duty factor of 50 percent. The sinusoidal output voltage is obtained in that the secondary switches switch with a sinusoidally varying phase shift compared to the primary switches.

German Published Application DE 39 12 941 discloses a voltage supply device having a corresponding inverting rectifier. The inverting rectifier is composed of a square-wave converter, of a transformer, of a power converter and of a filter means. The power converter and the filter means are designed for generating three line AC voltages The component parts for generating a line AC voltage are therefore present three times in these component parts. The functionings of the component parts for generating a line AC voltage, however, are respectively identical the difference is only in the respective chronological control.

For generating the individual line AC voltage, the square-wave converter has switch means controlled push-pull. The switch means convert a DC voltage into alternating successive upward and downward voltage pulses. The voltage pulses immediately follow one another and each respectively lasts for the same time without variation. The voltage pulses are conducted via the transformer. Following the transformer, the transmitted voltage pulses are subjected in the current transformer to a respectively prescribed chronological duration. The chronological duration of the individual taps is different for every transmitted voltage pulse. The underlying change in the chronological duration of the tap corresponds to the sinusoidal change of the sinusoidal line AC voltage to be generated. The voltage pulses acquired at the tap are then converted by the filter means into the sinusoidal line AC voltage to be generated.

One disadvantage of the above-described inverting rectifier is that current is constantly drawn from the DC voltage source and the DC source is thus constantly loaded since no return of energy into the voltage source is undertaken during the generation of the sinusoidal line AC voltage.

SUMMARY OF THE INVENTION

It is therefore an object of the present invention to provide a method for generating a sinusoidal line AC voltage wherein a return of energy occurs during the generation of the sinusoidal line AC voltage. It is also an object of the present invention to provide a circuit arrangement for the implementation of the method.

Proceeding from a method of the type initially cited, this object is achieved for the method of the present invention wherein, in a first case, the pulse-duty factor of the upward or, respectively, downward voltage pulses is respectively varied for each in the range between 0 and 50 percent or, respectively, in a second case, the pulse-duty factor of the upward or, respectively, downward voltage pulses is varied together in the range between 0 and 50 percent in accordance with the sinusoidal change of the sinusoidal line AC voltage to be generated. In the first case, those respective voltage pulses of the upward or, respectively, downward voltage pulses follow one another that have the same pulse-duty factors. In both cases, the secondary side of the high-frequency transformer is shorted by the voltage pulse pauses between the alternatingly successive upward or, respectively, downward voltage pulses, the voltage pulse pauses being caused by the variation of the pulse-duty factor given simultaneous constant pulse frequency.

Proceeding from a circuit arrangement of the type initially cited, the object of the present invention is achieved by a circuit arrangement composed of a square-wave voltage pulse shaper arranged at the input side and having switch means controlled push-pull, of a following high-frequency transformer, and of a voltage pulse tap circuit following the high-frequency transformer. A further switch means of the voltage pulse tap circuit is respectively controlled with a given, fixed pulse-duty factor, and a filter means is arranged at the output side.

The square-wave voltage pulse shaper has switch means controlled such that, in a first case, the switch means each respectively switch by themselves or, respectively, in a second case, the switch means switch together with a pulse-duty factor that varies in accordance with the sinusoidal variation of the sinusoidal line AC voltage to be generated. The voltage pulse tap circuit has further switch means controlled such that the further switch means shorts the secondary side of the high-frequency transformer in phases wherein the first switch means of the square-wave voltage pulse shaper are not switched.

In the method of the present invention, the duration of the voltage pulses generated alternately upward and downward from a DC voltage are already controlled in accordance with the sinusoidal change of the sinusoidal line AC voltage to be generated, being controlled before the transmission via a high-frequency transformer. Simultaneously, the secondary side of the high-frequency transformer is shorted during the occurrence of the voltage pulse pauses. A return of the energy stored in the filter means to the DC voltage source occurs in these phases, the DC voltage source being thereby relieved. The line AC voltage to be generated has a sinusoidal curve even when inductive and capacitive loads are to be supplied.

The circuit arrangement for the implementation of the method of the present invention has a square-wave voltage pulse shaper having switch means controlled push-pull such that the switch duration of the individually switched switch means is controlled in successive switching cycles in accordance with the sinusoidal variation of the sinusoidal line AC voltage to be generated. Simultaneously, a voltage pulse tap circuit has further switch means that shorts the secondary side of a high-frequency transformer in phases wherein no switch means is switched in the square-wave voltage pulse shaper, so that a transmission of the energy stored in a filter means back into the DC voltage source is possible. An advantage of this circuit arrangement is that the same circuit can also be used as a charging circuit for a DC voltage source.

In an advantageous development of the present invention, the shorting of the secondary side of the high-frequency transformer can occur on the basis of an additional switch means within the voltage pulse tap circuit, whereby the switch means are simpler to control for tapping the voltage pulses transmitted via the high-frequency transformer.

In another advantageous development of the present invention, the switch means responsible for tapping the voltage pulses transmitted via the high-frequency transformer accomplish the shorting of the secondary side of the high-frequency transformer. An additional switch means for this purpose can then be omitted, so that the circuit complexity is reduced.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIGS. 2a and 2b are schematic diagrams depicting operation of the switch means contained in the schematic circuit of FIG. 1;

FIGS. 4a and 4b are schematic diagrams depicting operation of the switch means contained in the schematic circuit of FIG. 3.

DESCRIPTION OF THE PREFERRED EMBODIMENT

Figure 1:
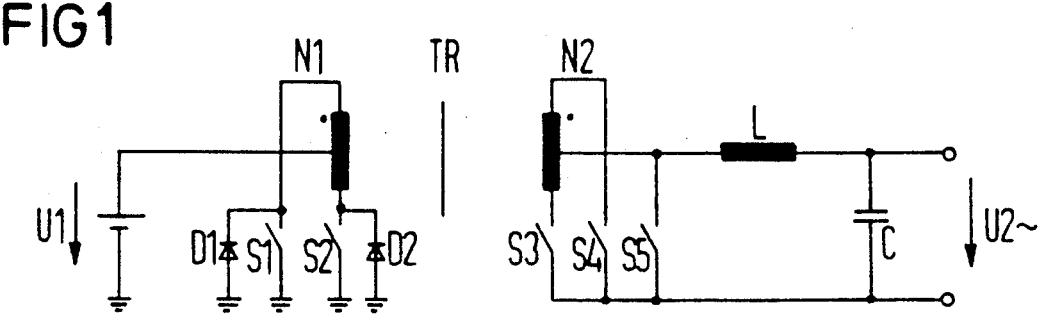
FIG. 1 is a first schematic circuit of a circuit arrangement of the present invention.

The circuit arrangement of FIG. 1 has a DC voltage source U1 that has its positive pole connected to the center tap of the primary winding of a high-frequency transformer TR. The negative pole of the DC voltage source U1 is connected to the grounded potential of the circuit arrangement. The two ends of the primary winding of the high-frequency transformer TR are each respectively connected to the grounded potential of the circuit arrangement via a switch S1 or S2, that is bridged by a diode D1 or D2 polarized in a non-conducting direction. The switches S1 and S2 as well as the diodes D1 and D2 can be interpreted as being a square-wave voltage pulse shaper.

Similar to the primary winding, the secondary winding of the high-frequency transformer TR has a center tap. An inductor L whose opposite side forms the one pole of the two output terminals of the circuit arrangement is connected to the center tap. An output capacitor C that is charged with the output voltage U2 is arranged between this pole and the second pole of the output terminals of the circuit arrangement. The output voltage U2 represents the sinusoidal line AC voltage to be generated. The two ends as well as the center tap of the secondary winding of the high-frequency transformer TR are each respectively connected via a further switch S3, S4, S5, to the second pole of the output terminals of the circuit arrangement. The further switches S3, S4, S5, operate as a voltage pulse tap circuit.

For generating a sinusoidal line AC voltage in the form of the output voltage U2, the two switches S1 and S2 are driven push-pull. The drive is schematically shown in FIGS. 2a and 2b in the lines for S1 and S2. The notation ON thereby indicates that the appertaining switch is switched on. Analogously thereto, the notation OFF states that the appertaining switch is switched off. The same is true of all other switches in this figure as well as in FIGS. 4a and 4b.

The drive of the switches S1 and S2 occurs such that the switches are switched in constant time intervals, whereby the respective switch duration differs. The switch duration changes according to the sinusoidal change of the sinusoidal line AC voltage to be generated. The constant time interval between the switching of the respective switches is selected such that no switching pauses arise in the interim given maximum on-duration. Given a shorter on-duration there are phases wherein neither one nor the other switch is switched.

The situation under discussion may be seen in FIGS. 2a and 2b whereby a distinction is made between two ranges U2>0 (FIG. 2a) and U2<0 (FIG. 2b) for the output voltage U2. A few switching cycles are illustrated in every range cycle of the switches. The diagram shown in FIG. 2 therefore is only a schematic illustration.

The two switches S1 and S2 in FIG. 1 shape the DC voltage of the DC voltage source U1 into a square-wave voltage having voltage pulses whose duration correspond to the sinusoidal change of the sinusoidal line AC voltage to be generated. The resulting square-wave voltage is transmitted via the high-frequency transformer TR. At the secondary side of the high-frequency transformer TR, the transmitted voltage pulses are each respectively tapped for a given chronological duration. The tap is accomplished by the switches S3 and S4. The switches S3 and S4 thereby switch in alternation having a pulse-duty factor of respectively 50 percent. The control outlay for this is low due to the constant pulse-duty factor. As shown in FIG. 2a for the voltage range U2>0 of the output voltage U2, the switch S3 simultaneously switches with the switch S2 whereas the switch S4 simultaneously switches with the switch S1.

During the phases wherein one of the switches S1 or S2 is switched, the switch S5 is open. During these phases, energy is transmitted from the primary side of the high-frequency transformer TR to the secondary side thereof. The current through the inductor L increases linearly and charges the output capacitor C. When the switches S1 and S2 are both switched off, the switch S5 is closed and shorts the secondary side of the high-frequency transformer TR. The closed switch S5 now acts as a freewheeling diode. The current through the inductor L decreases linearly in turn.

The magnitude of the output voltage U2 is set via the pulse-duty factor that the switches S1 and S2 exhibit at the respective moment. The output voltage U2 is calculated according to the equation:

$$U2 = 2 \cdot v_R / u \cdot U1,$$

where u=N1/N2 (ratio of the number of turns N1 and N2 of the primary winding and of the secondary winding of the high-frequency transformer TR) and where $v_T$ is the pulse-duty factor of the switch S1 or S2.

Let it be noted that the above-recited equation is valid when the current flows continuously through the inductor L or, respectively, does not reverse. When the current reverses in the inductor L during the phase wherein the switch S5 is closed, energy is transmitted from the secondary side of the high-frequency transformer TR to the primary side. When the switch S5 is opened, the voltage increases across S5. This voltage is transmitted via the closed switches S1 or, respectively, S2 and S3 or, respectively, S4 onto the primary side of the high-frequency transformer TR. When U2 represents a voltage source, energy can thereby be supplied into the DC voltage source U1. In case U2 does not deliver adequate energy, U2 drops in terms of voltage.

The voltage that would occur at the DC voltage source U1 in this operating mode is calculated according to the equation:

$$U1 = U2 \cdot u / (2 \cdot v_T),$$

where $v_T$ is the pulse-duty factor of the switches S1 or S2 and where the pulse-duty factor of the switch S5 is calculated at $v_T(S5) = 1 - 2 \cdot v_T$.

The recited equation for the voltages occurring at the DC voltage source U1 is valid for the operating mode wherein the current through the inductor L remains negative. When the underlying current direction here is intentionally produced, the circuit arrangement acts as a charging circuit.

FIG. 2b shows a voltage range U2<0. This voltage range corresponds with the respectively second half-wave of the sinusoidal line AC voltage or, respectively, output voltage U2. An output voltage having a negative polarity is simply generated in that the switches S3 and S4 of the voltage pulse tap circuit are driven antiphase relative to the switches S1 and S2 of the square-wave voltage pulse shaper. That is, the switches S1 and S3, as well as the switches S2 and S4 in this range are respectively simultaneously switched. In this operating mode, the energy flow is also guaranteed both in the direction from the primary side to the secondary side as well as from the secondary side to the primary side of the high-frequency transformer TR.

Figure 3:
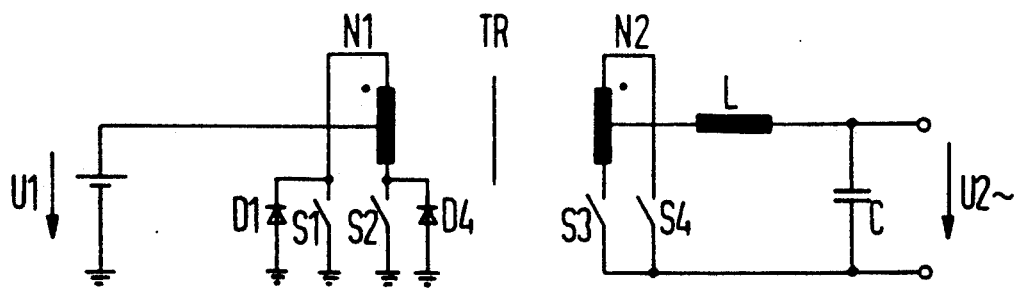
FIG. 3 is a second schematic circuit of a circuit arrangement of the present invention.

As a result of a different drive of the switches S3 and S4, of the voltage pulse tap circuit, the switch S5 can be omitted (FIG. 3). The switches S3 and S4 must merely be simultaneously closed for this purpose, when the intent is to close the switch S5 from FIG. 1.

Figure 4A:
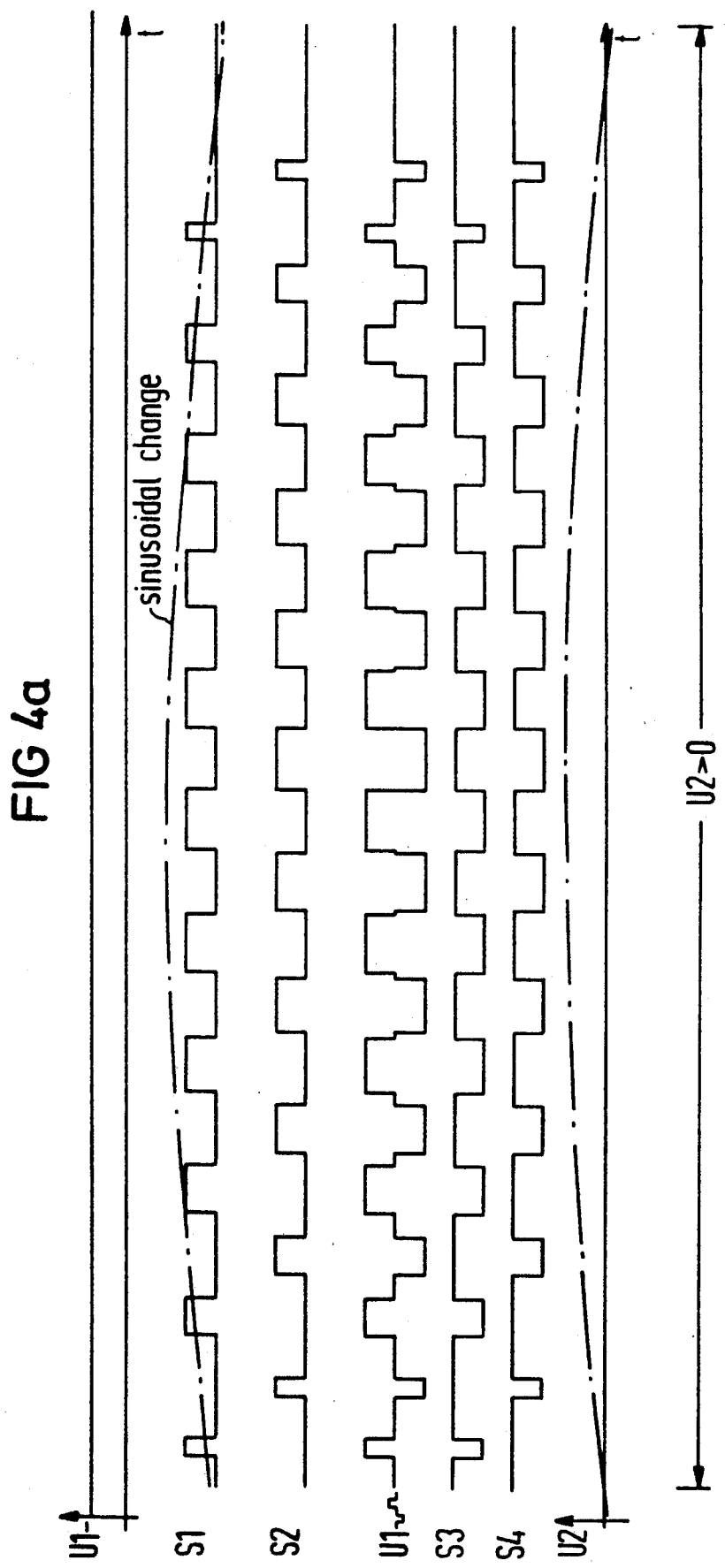

FIGS. 4a and 4b shows the drive of the individual switches S1 through S4 for both voltage ranges U2>0 (FIG. 4a) and U2<0 (FIG. 4b) of the output voltage U2. By analogy to that stated above, the same considerations are valid for the voltages and currents for the voltage range U2<0 as apply for the voltage range U2>0 but with opposite operational sign.

A sinusoidal output voltage U2 arises when the output voltage U2 is regulated according to the expression $|u2 \cdot \sin wt|$.

The voltage is switched in terms of its polarity in accord with the sine half-waves.

Figure 5:
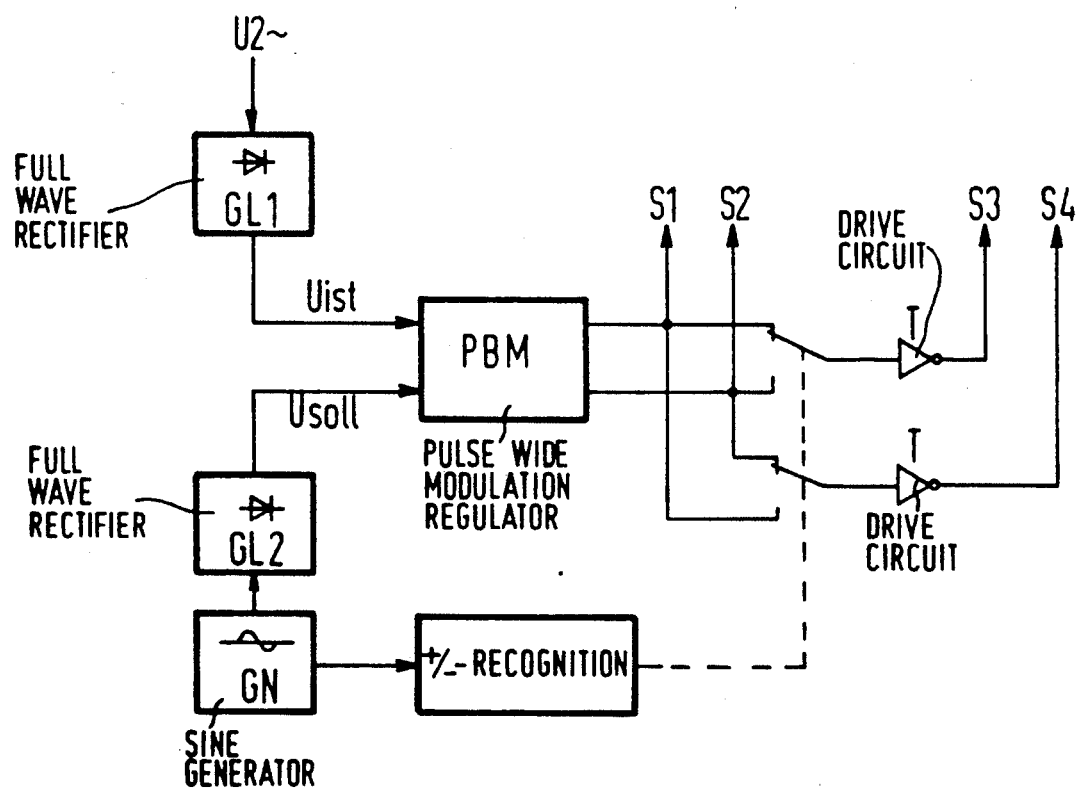
FIG. 5 depicts a control circuit in a schematic illustration for the switch means employed in FIGS. 1 through 4.

FIG. 5 shows a schematic illustration of a possible realization of a control circuit for controlling the switches S1 through S4 utilized in FIGS. 1 through 4b. The drive of the switches S3 and S4 as well as the voltage return of the output voltage U2 occur separated in terms of potential. An output current monitoring can be a component part of the control circuit.

The control circuit has a sine generator GN that delivers a sine signal having a given frequency. The sine signal generated by the sine generator is forwarded, first, to a full-wave rectifier GL2 and, second, to a circuit for +/− recognition, i.e. for recognizing the positive and negative half-wave of the sine signal. The full-wave rectifier GL2 implements a formation of the amount of the sine signal delivered by the sine generator GN, whereas the circuit for the +/− recognition generates control signals for switching to a switch-over means dependent on the appearance of a positive or negative half-wave of the incoming sine signal. The output signal of the full-wave rectifier GL2 is supplied to a pulse-width modulation regulator PBM as a rated signal Usoll. In addition to being supplied with the rated signal Usoll, the pulse-width modulation regulator PBM is supplied with an actual signal Uist that is the output signal of another full-wave rectifier GL1. The input of this full-wave rectifier GL1 for forming the actual signal Uist is the output voltage U2 of the circuit arrangement set forth in FIGS. 1 through 4b.

For each half-wave, the pulse-width modulation regulator PBM forms a pulse-width modulated output signal from the difference between the rated signal Usoll and the actual signal Uist. For each half-wave, the pulse-width-modulated output signal is output via one of two outputs. The switch S1 in the circuit arrangement set forth in FIGS. 1 through 4b is controlled by one output signal of one output and the switch S2 of the circuit arrangement is controlled by the other output signal of the other output.

The output signals of the two outputs of the pulse-width modulation regulator PBM are each respectively connected in parallel to the two afore-mentioned switch-over means that respectively select between the output signals. The respectively selected signals are used for the control of the switches S3 and S4. The one output signal thereby drives the switch S3 and the other output signal drives the switch S4. The output signals are previously conducted via driver circuits T for the control of the switches S3 and S4. The selection of the respective output signals of the pulse-width modulation regulator PBM by the switch-over means or, respectively, the allocation of one of the output signals to the associated switch S3 or, respectively, S4 occurs on the basis of the control signals of the circuit for the +/− recognition in accordance with the statements about the switches S1 through S4 provided in conjunction with FIGS. 1 through 4b.

The pulse-width modulation regulator PBM can be, for example, an IC module SG 35 26 of Silicon General.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A method for generating a sinusoidal line AC voltage from a DC voltage that, for transmission via a high-frequency transformer, is converted into alternatingly successive upward and downward square-wave voltage pulses having a respectively maximum pulse-duty factor of 50 percent and a constant pulse frequency, being tapped with a respectively given, fixed pulse-duty factor after the transmission and being then filtered, comprising the steps of:

varying the pulse-duty factor of the upward or, respectively, downward voltage pulses in the range between 0 and 50 percent in accordance with the sinusoidal change of the sinusoidal line AC voltage;

shorting the secondary side of the high-frequency transformer during voltage pulse pauses between the alternatingly successive upward or, respectively, downward voltage pulses, said voltage pulse pauses being caused by the variation of the pulse-duty factor given simultaneous constant pulse frequency.

2. The method according to claim 1, wherein the voltage pulses transmitted via the high-frequency transformer are respectively tapped with a constant pulse-duty factor of 50 percent.

3. The method according to claim 1, wherein a tap of the voltage pulses transmitted via the high-frequency transformer occurs such that the shorting of the secondary side of the high-frequency transformer occurs during the phases of the pulse pauses, occurring on the basis of a switch means provided for the tap of the transmitted voltage pulses.

4. Circuit arrangement for generating a sinusoidal line AC voltage from a DC voltage, comprising:

a square-wave voltage pulse shaper arranged at an input side of the circuit arrangement and having first switch means controlled push-pull;

a high-frequency transformer having a primary side connected to the input side, a voltage pulse tap circuit connected to a secondary side of the high-frequency transformer and having second switch means respectively controlled with a given, fixed pulse-duty factor, and a filter means arranged at an output side of the circuit arrangement and connected to the secondary side of the high-frequency transformer;

the square-wave voltage pulse shaper having the first switch means controlled such that the first switch means switch with a pulse-duty factor that varies in accordance with the sinusoidal variation of the sinusoidal line AC voltage to be generated; and the voltage pulse tap circuit having the second switch means controlled such that the second switch means shorts the secondary side of the high-frequency transformer in phases wherein the first switch means of the square-wave voltage pulse shaper are not switched.

5. The circuit arrangement according to claim 4, wherein the voltage pulse tap circuit has an additional switch means that is controlled such that the shorting of the secondary side of the high-frequency transformer occurs with the additional switch means during the phases wherein the first switch means of the square-wave voltage pulse shaper are not switched.

6. A method for generating a sinusoidal line AC voltage from a DC voltage comprising the steps of:

converting the DC voltage into alternating successive upward and downward square-wave voltage pulses having a respectively maximum pulse-duty factor of 50 percent and a constant pulse frequency;

supplying the square-wave voltage pulses to a primary of a high-frequency transformer;

tapping the square-wave voltage pulses from a secondary of the high-frequency transformer with a given, fixed pulse-duty factor and filtering the tapped square-wave voltage pulser to generate the AC voltage;

varying the pulse-duty factor of the upward or, respectively, downward voltage pulses in the range between 0 and 50 percent in response to sinusoidal changes of the sinusoidal line AC voltage; and shorting the secondary side of the high-frequency transformer during voltage pulse pauses between the alternatingly successive upward or, respectively, downward voltage pulses, said voltage pulse pauses being caused by the variation of the pulse-duty factor given simultaneous constant pulse frequency.

7. The method according to claim 6, wherein the voltage pulses transmitted via the high-frequency transformer are respectively tapped with a constant pulse-duty factor of 50 percent.

8. The method according to claim 6, wherein the tapping of the voltage pulses transmitted via the high-frequency transformer occurs such that the shorting of the secondary side of the high-frequency transformer occurs during the phases of the pulse pauses, occurring on the basis of a switch means provided for the tap of the transmitted voltage pulses.

9. A circuit arrangement for generating a sinusoidal line AC voltage from a DC voltage, comprising:

square-wave voltage pulse shaper means for forming square-wave voltage pulses from the DC voltage and having a first switch means controlled push-pull;

high-frequency transformer means for transmitting the square-wave voltage pulses and having a primary and a secondary, said primary connected to said square-wave voltage pulse means;

voltage pulse tap means for receiving said transmitted square-wave voltage pulses and connected to said secondary of said high-frequency transformer, and having second switch means with a fixed pulse duty factor;

filter means for generating the AC voltage from said transmitted square-wave voltage pulses and connected to said voltage pulse tap means;

means for controlling said first switch means such that the first switch means switch with a pulse-duty factor that varies in response to sinusoidal variation of the sinusoidal AC voltage;

means for controlling said second switch means such that said second switch means shorts said secondary of said high-frequency transformer in phases where said first switch means are both open.

10. The circuit arrangement according to claim 9, wherein said voltage pulse tap means has a third switch means and has means for controlling said third switch means such that said secondary of said high-frequency transformer is shorted by said third switch means during the phases.

* * * * *